United States Patent [19]
Shima et al.

[11] 3,892,900
[45] July 1, 1975

[54] MASKING FILMS

[75] Inventors: Keizo Shima, Suita; Tetsuo Ishihara, Amagasaki, both of Japan

[73] Assignee: Daicel Ltd., Japan

[22] Filed: Oct. 24, 1973

[21] Appl. No.: 409,162

[30] Foreign Application Priority Data
Nov. 2, 1972 Japan.............................. 47-110033
Nov. 2, 1972 Japan.............................. 47-110034
Sept. 10, 1973 Japan.............................. 48-102450

[52] U.S. Cl. .............. 428/40; 101/128.2; 156/153; 428/141; 428/220
[51] Int. Cl.............................................. B41n 1/24
[58] Field of Search ........... 161/406, 164, 167, 231, 161/234, 227, 247, 253, 182, 183, 6; 156/3, 153; 101/128.2; 117/35.5

[56] References Cited
UNITED STATES PATENTS

| | | | |
|---|---|---|---|
| 1,781,834 | 11/1930 | D'Autremont.................. | 101/128.2 |
| 2,162,332 | 6/1939 | Frick................................ | 161/167 |
| 2,576,491 | 11/1951 | Ulano............................ | 117/35.5 X |
| 2,684,918 | 7/1954 | Oughton......................... | 161/406 X |
| 3,036,930 | 5/1962 | Grimminger........................ | 117/93 |
| 3,065,120 | 11/1962 | Avelar............................ | 161/406 X |
| 3,227,605 | 1/1966 | Wolinski et al..................... | 161/247 |

*Primary Examiner*—Harold Ansher

[57] ABSTRACT

A substantially transparent and colored masking film for photoengraving has a substantially transparent supporting plastic film on which an adhesive undercoating, a colored resin layer and a pressure-sensitive adhesive are successively laminated. A strippable plastic film is set over the adhesive layer of said laminate.

15 Claims, No Drawings

MASKING FILMS

This invention relates to a novel masking film and a method for preparing the same. More particularly, it relates to a novel, substantially transparent and colored film which is opaque to light that is active to expose photo-sensitive materials and transparent to other visible light, and which employs, as a supporting film, a substantially transparent plastic film on which an adhesive undercoating, a colored resin layer and a pressure-sensitive adhesive are successively laminated. A strippable plastic film is over the adhesive layer of said laminate. The invention further provides a laminate which is an intermediate for the masking film and a method for preparing the same.

The objects and advantages of the invention will be understood by the following explanation.

The substantially transparent and colored film which is provided by the invention is used in photoengraving. Photoengraving is generally conducted by the recent development of plate-making wherein artwork is transferred to a photo original plate. In such cases, the photo original plate is prepared by transferring the artwork to a photograph having masking properties.

As masking films which have been used for artwork, there is a laminate which was prepared by applying a rubber pressure-sensitive adhesive agent upon a strippable sheet of glassine paper, wax paper or vinyl chloride resin and carrying a nitrocellulose lacquer as masking layer (e.g. U.S. Pat. No. 2,576,491). Another prior art development is a polyethyleneterephthalate film applied to a vinyl chloride resin containing a dye.

The former of such masking films has the disadvantage of a variance of its dimensions under the influence of temperature and humidity in the ambient atmosphere as well as an undesired expansion and contraction due to the heat of the light source which is generally used in the preparation of a photo original plate, i.e. there is a lack of thermal dimensional stability and hygroscopic dimensional stability. Besides, when it is desired exactly to copy a picture, this prior art masking film results in a vague image in the final plate around the real image due to the comparatively thick nitrocellulose layer. Also, the pattern which is separated from the strippable layer is easily broken and lengthened.

The latter product, polyethyleneterephthalate film carrying a vinyl chloride resin containing a dye, suffers from the fact that it is impossible to adhere the vinyl chloride resin layer on artwork or to stick it on a silk screen or photographic plate. Furthermore, there was a problem in the lack of toughness of the stripped layer.

As a result of the inventors' studies to find masking film not having such disadvantages, the inventors have arrived at the novel masking film of the invention which has opacity to the light which is active to expose photo-sensitive materials and which has transparency to other visible light. The masking film of the invention is provided by laminating the treated surface of a substantially transparent supporting plastic film in which at least one surface is roughened or oxidized, with a colored resin layer through an adhesive undercoating, and adhering to the resin layer a strippable surface of a film having at least one strippable surface through a pressure-sensitive adhesive layer.

The main characteristic of the masking film of the invention is its excellent dimensional stability, such as thermal dimensional stability, hygroscopic dimensional stability, dimensional stability on standing, and the like. While it is easy to remove the release film (i.e. the strippable surface) from the masking film, the remaining film will keep its shape well and is able to adhere; it is suitable for re-use for purposes of amendment such as arrangement of camera ready art, or other objects. Furthermore, the masking film of the invention is suitable for use when it is needed to reproduce artwork exactly. In addition, the film has the industrial advantage of being able to be manufactured by using commercially available machines and in compact procedures.

As the supporting plastic film to be used in the invention there may be mentioned oriented or non-oriented films, for instance, polyester or polyether films such as polyethyleneterephthalate, polybutyleneterephthalate, polyoxybenzoate or polyisobutyleneoxide film and the like; homopolymeric or copolymeric films such as polycarbonate, polystyrene, nylon-6, nylon-66, nylon-10, nylon-11 or nylon-12 film and the like; polyethylene, polypropylene, polybuten-1 or poly(4-methylpentene-1) film or copolymeric film in which the main components are these polyolefines.

It is desirable to use as the supporting plastic film a biaxially oriented polypropylene or polyethyleneterephthalate film or nylon-12 film which is 6–200 microns in thickness, especially 9–50 microns, and which is substantially transparent.

These plastic films are used in the invention after a roughening or oxidizing treatment on at least one side in accordance with a conventional method. An example of oxidizing treatments is a corona discharge treatment and as a roughening treatment a sand-blasting method or a solvent etching method may be used.

The colored resin layer is adhered on the treated surface of the above mentioned plastic film in which at least one side is treated by roughening or oxidation, through an adhesive undercoating.

The undercoatings which may be used in the invention are those which are able to tightly adhere to the plastic supporting film and the colored resin layer, are transparent and not colored, and have good thermal and hygroscopic stability.

As the adhesive undercoating there may be mentioned a mixture of an isophthalic polyester, butyl-etherified melamine and a small amount of sulfuric acid; a mixture of an isophthalic polyester and a preliminary condensate of a polyol and a diisocyanate having remaining active isocyanate groups; and a mixture of a copolymer of vinyl chloride and vinyl acetate with a preliminary condensate of a polyol with a diisocyanate having remaining active isocyanate groups.

When a polyolefine, polystyrene, polyester or polyether plastic film is used as the supporting plastic film in the invention, it is desirable to use a mixture of an isophthalic polyester, butyl-etherified melamine and a small amount of sulfuric acid as the adhesive undercoating.

The isophthalic polyester in said mixture is a condensate of isophthalic acid with a diol, in which the diol may be a saturated alcohol, such as ethylene glycol, propylene glycol or the like or an unsaturated alcohol such as butenediol, hexenediol or the like.

The butyl-etherified melamine is one which is obtained by reacting melamine with formaldehyde to give a melamine-formaldehyde condensate and by butyl-etherifying it with a large amount of butanol, the product of which becomes soluble in benzene. The product is used as a solution in a solvent mixed with toluene and ethyl acetate by replacing the medium of butyl-etherification with said solvent.

The preferred weight ratio of isophthalic polyester to butyl-etherified melamine is from about 2:8 to 9:1, desirably from about 6:4 to 8:2. When sulfuric acid is added to said mixture as a hardening catalyst in the range of 0.5 to 1 part per 100 parts by weight of the butyl-etherified melamine, it can give a good hardened coat at the temperature of 80°–150°C.

It is possible to add to the undercoating other ingredients such as an antistatic agent, antioxidant, ultraviolet ray absorbent, heat stabilizer, dye or pigment, waxes or inorganic fine powders as an antiblocking agent or lubricant, as long as they will not give any unfavorable influence on the binding ability of the undercoating. Such undercoating should be applied as thin as possible, preferably in the thickness of about 0.5–3 microns.

As the resins to be used for the formation of the colored resin layer there may be mentioned nitrocellulose, cellulose acetate, cellulose acetate propionate, cellulose acetate butyrate, ethoxy cellulose, vinyl chloride resin, styrene resin, acrylic acid or acrylic ester resin, polyester resin, polyurethane resin, polyamide resin, amino resin, aminoalkyd resin and the like. Colorants, which are used in the form of colored lacquer or ink, are added to the resins.

The property of the masking film which has opacity to the light that is active to photo-sensitive materials and has transparency to other visible light may be adjusted by the colored resin layer. For instance, to mask for blue sensitive material, the colored resin layer should be deep blue, deep green, deep yellow-orange or deep red. For an ortho sensitive material, the resin layer should be deep orange or deep red. For a semi-panchromatic material, the resin layer should be deep green.

The most preferred resin to be used as the colored resin layer is nitrocellulose, such as a conventional nitrocellulose lacquer (SS type cotton or RS type cotton) having a viscosity from one-eighth to 120 seconds. When a nitrocellulose having a viscosity less than one-eighth second is used, the layer coated from the nitrocellulose lacquer is brittle and when the viscosity is over 120 seconds, application of the lacquer becomes difficult because the viscosity of the nitrocellulose lacquer is so high.

As colorants for nitrocellulose there may be used dyes or a mixture of dyes and pigments. Dyes are not limited in their color tone or structure, if they are oil soluble and compatible with nitrocellulose (or other resin used) and have minimized variance of color tone against heat and ultraviolet rays, and give enough masking property for the masking film to be prepared.

It is also not excluded to add an organic or inorganic pigment if it does not give any unfavorable influence on the transparency of the nitrocellulose coating for light at a desired wave length range. The extent of interruption of passing of light through the colored resin layer may be controlled by both the amount of dye in this resin layer and the thickness of the resin layer.

It is possible to add other ingredients to the colored lacquer used to form the colored resin layer, such as an anti-oxidant, heat stabilizer, ultraviolet ray absorbent, antistatic agent, platicizer, antiblocking agent and lubricant when they are needed. The method for applying said lacquer may be any method, such as using a roto-gravure printing machine, roll coater, bar coater, spray gun or dipping coater. A colored lacquer of nitrocellulose is adhered to the roughened or oxidized surface of the plastic film through the undercoating. When other resins besides nitrocellulose are used, colored lacquers may be prepared as done in the preparation of the colored lacquer of nitrocellulose.

It is desired to apply the colored resin layer as thin as possible, e.g. the thickness of the layer after evaporation of solvent used being 3–10 microns, for which the concentration of the colorant in the lacquer should be high. For example, the colorant may be preferably from about 80 to 120 parts by weight per 100 parts by weight of resin.

The undercoating to be used in the invention improves the adhesiveness of the plastic film to the colored resin layer. In addition, when the masking film is used for photoengraving, there is no problem resulting from a shift of wave length range to be masked by reason of coloration or color change in the colored layer or other layers. The plastic film set on said undercoating is excellent in thermal resistance, resistance to weathering, hot water resistance and the like.

A pressure-sensitive adhesive layer may be applied to said colored resin layer. As pressure-sensitive adhesives to be used, there may be mentioned rubber or other transparent pressure-sensitive adhesives, which may contain the same dyes or pigments as are used in coloring the nitrocellulose lacquer, unless they give an unfavorable influence on pressure-sensitive adhesiveness.

A laminate having masking properties may be prepared by pressing and adhering the adhesive surface of the pressure-sensitive adhesive surface of the masking film of the invention to the strippable surface of a strippable plastic film.

Alternatively, the laminate may be prepared by applying and drying a pressure-sensitive adhesive layer on a transparent strippable film and then laminating this to the colored resin layer of the masking film of the invention.

The transparent strippable film has as its base a film which is similar to the plastic film used as the support in the invention as explained above and has on at least one side a strippable property. The strippable property is obtained by using a release agent, which may be a silicone resin, a copolymer of methacrylic acid or acrylic acid having a long side chain such as polystearyl acrylate or waxes (e.g. wax release agent referred to in Japanese Patent Publication No. 3382/1959), or any other agent that gives a transparent strippable coat. However, it is especially preferred to use a vinylsilane silicone resin along with an organic peracid from the viewpoints of strippable property and transparency. It is recommended to apply, dry and cure this combination on the strippable plastic film by which silicone resin crosslinking is carried out.

In the masking film of the invention it is preferable that the thickness of all layers, excluding the transparent strippable film, is about 15–70 microns, especially about 15 to 35 microns. The thickness of the layers, excluding the strippable film and the support film, is preferably in the range of about 5.5 to 20 microns.

The invention will be illustrated by the following Examples, without being limited to them.

EXAMPLE 1

An isotactic polypropylene film, having a melt index of 2.0 and oriented in machine direction and transverse direction to seven times to give a biaxially oriented polypropylene film having thickness of 18 microns, was corona-discharged to obtain a film having a contact angle of the discharged treatment surface to water of 70°C.

The resulting film was coated with the following composition:

| | | |
|---|---|---|
| Isophthalic polyester | 50 | parts |
| Butyl-etherified melamine | 50 | parts |
| Sulfuric acid | 0.5 | parts |
| Ethyl acetate | 420 | parts |
| Toluene | 210 | parts |
| Methyl ethyl ketone | 210 | parts |
| Methyl alcohol | 58.4 | parts |
| Stearic acid amide | 1.0 | parts |
| Fine silica powder (average diameter: 0.3μ) | 0.1 | parts |

The coating was conducted by a gravure coater and the coated film was dried for about 1.5 min. in an oven at 120°C to give a film in which the thickness of the coated layer was 1μ. The thickness of both layers was 19μ. Said film showed transmission of 90%. No change in its adhesiveness and appearance was recognized even after dipping in boiling water for 30 min. and it was not discolored after irradiation for 150 hrs. with ultraviolet rays.

Then the following composition was prepared as the colored nitrocellulose lacquer:

| | | |
|---|---|---|
| Nitrocellulose (SS, ½ second) | 150 | parts |
| Red dye (Neozaphon red) | 75 | parts |
| Yellow dye (Neozaphon yellow) | 75 | parts |
| Methyl ethyl ketone | 460 | parts |
| Isopropyl alcohol | 40 | parts |
| Toluene | 200 | parts |

The nitrocellulose lacquer as above was applied on the undercoating of the polypropylene film by a gravure coater and dried to remove the solvent to give a deep red film in which the thickness of the coated nitrocellulose layer was 5μ and the total thickness was 24μ. The measurement of transmission of said film by a Beckmann spectrophotometer shows 0% transmission at a wave length of 200–590 millimicrons and passage of light at a wave length longer than 590μ.

Then, on the surface of said red nitrocellulose layer was applied an acrylic adhesive so as to provide a 7μ thick dried adhesive layer. The resulting pressure-sensitive masking film had a total thickness of 31μ.

A wax release agent was applied on a biaxially oriented polypropylene base film to provide a 0.2μ thick coated layer, the strippable film having a total thickness of 110μ. The masking film and the strippable film were laminated together by pressing the strippable film against the pressure-sensitive adhesive surface of the masking film, with the urethane wax layer therebetween. It was found that said laminate possessed excellent hygroscopic dimensional stability, since variance in its dimension was ± 0.001% in changing relative humidity from 0% to 90% (or 90% to 0% reversely) at 40°C as measured by use of a cathetometer.

Then the laminate was heated in an oven at different temperatures for 10 min. and its thermal dimensional stability was measured from variances of dimension before and after heat treatment, as reported below:

| Temperature | Variance rate of dimension |
|---|---|
| 50°C | ± 0.00% |
| 60°C | ± 0.01% |
| 70°C | ± 0.02% |

The pressure-sensitive adhesive masking film of the laminate was peeled off from the strippable film to prepare a strip of 15 mm × 150 mm which showed 4.5 Kg/mm of tensile strength and 120% of elongation in measurement with a tensile tester.

The laminate was put on an artwork and the masking layer was cut in the shape of the artwork. Those parts of the masking layer not corresponding to the artwork were removed from the laminate to give a masking film having a pattern identical to the artwork on a transparent strippable film.

The laminate carrying the pattern was closely attached to "Fuji lith-ortho film type F" of Fuji Photo Film Co., Ltd. and development was conducted after exposing it for 1 min. to the light of a xenon lamp. It was found that the film possessed an excellent shading property, with no photo-sensitive development on the part corresponding to the pattern in the masking film.

EXAMPLE 2

A solution containing vinylsilane silicone resin and a small amount of benzoyl peroxide as a hardening agent was applied on a biaxially oriented polypropylene film of 120μ and dried and cured for 3 min. at 130°C to obtain a transparent strippable film in which the thickness of the dried coated layer was 0.1μ and the total thickness was 120μ. This transparent strippable film was laminated to the masking film of Example 1 in the same way as in Example 1.

The masking layer of said laminate was cut in the outline of an artwork and the resulting masking pattern was, utilizing its adhesiveness, adhered to a PS plate under the trademark of PLANOSUPPER POSITIVE GRENCOAT of Fuji Photo Film Co., Ltd. which was exposed for 6 min. to a xenon lamp and etched. It was found that no photo image was formed on the part corresponding to the pattern in the masking film.

Peeling tests were conducted by adhering the masking layer from this Example and the masking film cut off from the laminate of Example 1 to the photo-sensitive emulsion face of a photo-sensitive film and allowing them to stand for 24 hrs. at room temperature and then stripping off the masking layers. It was found that the masking film of this Example was more easily stripped than the one of Example 1, showing a peeling strength at 90°C of the masking film of this Example of 170 g/ 25 mm, whereas that of the masking film of Example 1 was 320 g/ 25 mm.

EXAMPLES 3–9

The undercoating compositions as shown below were applied on the treated surface of a biaxially oriented polyethyleneterephthalate film after corona-discharging or sand-blasting treatment by using a gravure printing machine set on gravue cylinder of line numbers being 150 lines and deepness of cell being 35μ. The thickness of the undercoating was 2μ in each product.

Table I

| TEST NO. | THICKNESS OF POLYETHYLENE TEREPHTHALATE FILM | PRE-TREATMENT | UNDERCOATING COMPOSITION | |
|---|---|---|---|---|
| 1 | 6 μ | corona-discharge | A 100 parts<br>B 10 parts | S 400 parts |
| 2 | 6 μ | corona-discharge | C 100 parts<br>B 15 parts | S 400 parts |
| 3 | 9 μ | corona-discharge | A 100 parts<br>B 10 parts | S 400 parts |
| 4 | 9 μ | corona-discharge | C 100 parts<br>B 15 parts | S 400 parts |
| 5 | 12 μ | corona-discharge | A 100 parts<br>B 10 parts | S 400 parts |
| 6 | 12 μ | sand-blast on one surface | C 100 parts<br>B 10 parts | S 400 parts |
| 7 | 20 μ | sand-blast on both surfaces | A 100 parts<br>B 10 parts | S 400 parts |

Notes:
"S" means a mixture of methyl ethyl ketone and toluene (1:1)
"A" means VINYLITE VAGH (copolymer of vinyl chloride/ vinyl acetate/ vinyl alcohol in weight ratio of 91:4:5) of Union Carbide Co., Ltd.
"C" means TOYOBO ESTER RESIN (polyester resin) of Toyobo Co., Ltd.
"B" means a condensate of tolyenediisocyanate and hexantriol of Japan Polyurethane Co., Ltd. named as CORONATE L.

When the following composition was prepared as a vinyl chloride color lacquer:

| | |
|---|---|
| VINYLITE VMCH* | 150 (parts by weight) |
| Red dye (Neozaphon red) | 75 (parts by weight) |
| Yellow dye (Neozaphon yellow) | 75 (parts by weight) |
| Methyl ethyl ketone | 460 (parts by weight) |
| Toluene | 240 (parts by weight) |

*VINYLITE VMCH is a copolymer of vinyl chloride/vinyl acetate/ maleic acid in weight ratio of 86:13:1 of Union Carbide Co., Ltd.

Deep red films of a thickness of 5μ were prepared by applying the above color lacquer on each of the undercoated films of Test Nos. 1–7 and drying them for 30 seconds in an oven at 70°C to evaporate the solvent.

The characteristics of the resultant red films were as follows:

Transparency of the red films was measured by using a Beckmann spectrophotometer. Their transparency was 0% in the wave length range of 200–590 mμ and they allowed the passage of light at wave lengths longer than 590 mμ.

Then laminates were prepared by applying an acrylic adhesive on the surface coated with the vinyl chloride lacquer so as to provide a 7μ thick dried coated layer, and pressing each of the resulting masking films having pressure-sensitive adhesiveness with a strippable film of 125μ thickness which was obtained by applying a urethane wax on a biaxially oriented polyethyleneterephthalate film as base film so as to provide a coated wax layer of about 0.2μ of thickness.

Among these laminates, the colored layers in the films of Examples 3–6 could be cut easily with a razor in the outline of an artwork to give a pattern. Also, the colored layers in the films of Examples 7–9 could be smoothly cut with a ruby or diamond cutter.

Table II

| Example No. | Base Film | Adhesiveness of Color Lacquer | Appearance | Variance Rate in Dimension (60°C) |
|---|---|---|---|---|
| Control | No pre-treatment & undercoating 12μ of PET | Non-adhesion | Red transparent | + 0.01 (%) |
| 3 | Test No. 1 film | Excellent | Red transparent | − 0.05 (%) |
| 4 | Test No. 2 film | Excellent | Red transparent | − 0.05 (%) |
| 5 | Test No. 3 film | Excellent | Red transparent | + 0.02 (%) |
| 6 | Test No. 4 film | Excellent | Red transparent | + 0.02 (%) |
| 7 | Test No. 5 film | Excellent | Red transparent | + 0.01 (%) |
| 8 | Test No. 6 film | Excellent | Red transparent | + 0.01 (%) |
| 9 | Test No. 7 film | Excellent | Red semi-transparent | + 0.005 (%) |

Note:
"PET" is a biaxially oriented polyethyleneterephthalate film

It was possible to write or draw upon the film of Example 9 with a pencil before cutting because the outer surface of the support film was roughened.

The colored layers, except for Examples 3 and 4, were easy to handle and could adhere to an object to be masked and then peeled away.

EXAMPLE 10

A colored film was prepared by applying the colorant as used in Example 3, through the undercoating of Test No. 2 in Table I, on a cast nylon-12 film having a thickness of $18\mu$ which was obtained by making a film from a polymer of an average molecular weight of 100,000 obtained by polymerization of laurolactam and which was corona-discharged. A transparent strippable film having a total thickness of $120\mu$ was prepared by applying a solution containing vinylsilane silicone resin as the main component and a small amount of benzoyl peroxide as hardening agent on a biaxially oriented polypropylene film of $120\mu$ and drying and curing for 3 min. at 130°C.

A laminate was prepared by applying the following pressure-sensitive adhesive composition on said transparent strippable film so as to provide a coated layer of $7\mu$ thickness after drying, and pressing the thus-coated polypropylene film over the above colored nylon-12 film:

| | |
|---|---|
| ALLON S-1602 (acrylic adhesive, Toa Chem. Ind. Co., Ltd.) | 100 parts by weight |
| CORONATE HL | 2 parts by weight |
| Methyl ethyl ketone | 100 parts by weight |

Note:
"CORONATE HL" is a preliminary condensate of urethane prepared from hexamethylene-diisocyanate.

The laminate was easily separated into a transparent strippable film layer and a pressure-sensitive adhesive masking film layer, the latter of which possessed the following characteristics:

TABLE III

| | | Control | Example 10 |
|---|---|---|---|
| Pre-treatment | | no | corona-discharge |
| Undercoating | | no | Test No. 2 composition in Examples 3-9 |
| Adhesiveness of Colored Lacquer | | poor | excellent |
| Variance Rate in Dimension of Masking film layer | 60°C | +0.02 | +0.02 |
| | 70°C | +0.07 | +0.07 |
| | 80°C | −0.10 | −0.10 |

The masking layer of said laminate was cut in the form of an artwork and the resulting masking pattern was adhered to a PS plate as described in Example 2, which was exposed for 6 min. to a xenon lamp and etched. No photo-image was formed on the part corresponding to the pattern in the masking film.

What we claim is:

1. A masking film for masking a photo-sensitive material, consisting essentially of a laminate of:
    A. a substantially transparent supporting plastic film, at least one surface having been treated by roughening or oxidation;
    B. a colored resin layer adhered on said treated surface through an adhesive undercoating, the color of said resin layer being such as to be opaque to light used to expose said photo-sensitive material and transparent to other visible light; and
    C. a strippable film having at least one strippable surface adhered to said colored resin layer through a pressure-sensitive adhesive.

2. A masking film in accordance with claim 1, in which the substantially transparent supporting plastic film is a film of polyethyleneterephthalate, polybutyleneterephthalate, polyoxybenzoate, polyisobutyleneoxide, polycarbonate, polystyrene, nylon-6, nylon-66, nylon-10, nylon-11, nylon-12, polyethylene, polypropylene, polybuten-1 or poly(4-methylpentene-1).

3. A masking film in accordance with claim 1, in which the substantially transparent supporting plastic film is a biaxially oriented polypropylene or polyethyleneterephthalate film, or a non-oriented nylon-12 film.

4. A masking film in accordance with claim 1, in which the adhesive undercoating comprises a mixture containing isophthalic polyester, butyl-etherified melamine and a small amount of sulfuric acid, a mixture containing isophthalic polyester and a preliminary condensate of a polyol with a diisocyanate having remaining active isocyanate groups or a mixture containing a vinyl chloride/vinyl acetate copolymer and a preliminary condensate of a polyol with a diisocyanate having remaining active isocyanate groups.

5. A masking film in accordance with claim 1, in which the adhesive undercoating comprises a mixture containing isophthalic polyester, butyl-etherified melamine and sulfuric acid in which the weight ratio of isophthalic polyester and butyl-etherified melamine is about 2:8 to 9:1 and the weight ratio of sulfuric acid and butyl-etherified melamine is about 1:100 to 0.5:100.

6. A masking film in accordance with claim 1, in which the colored resin layer comprises a resin selected from the group consisting of nitrocellulose, cellulose acetate, cellulose acetate propionate, cellulose acetate butylate, ethoxy cellulose, vinyl chloride resin, styrene resin, acrylic acid resin, acrylic ester resin, polyester resin, polyurethane resin, polyamide resin, and aminoalkyd resin, and 80 to 120 parts by weight of a colorant per 100 parts by weight of the resin.

7. A masking film in accordance with claim 1, in which the total thickness of layers (A) and (B) and the pressure-sensitive adhesive is about 15 to 70 microns and the total thickness of all layers except the strippable film and the substantially transparent supporting plastic film is about 5.5 to 20 microns.

8. A masking film in accordance with claim 1, which comprises a laminate of a substantially transparent biaxially oriented polypropylene film having a corona discharged surface, a reddish nitrocellulose layer adhered to said surface through an adhesive undercoating containing isophthalic polyester, butyl-etherified melamine and sulfuric acid, and a biaxially oriented polypropylene film over said nitrocellulose layer, a wax release agent layer on said polypropylene film being against said nitrocellulose layer.

9. A masking film in accordance with claim 1, which comprises a laminate of a substantially transparent biaxially oriented polypropylene film having a corona discharged surface, a reddish nitrocellulose layer adhered to said surface through an adhesive undercoating containing isophthalic polyester, butyl-etherified melamine and sulfuric acid, and a biaxially oriented polypropylene film over said nitrocellulose layer, a vinylsilane silicone resin surface coated on said biaxially oriented polypropylene film being against said nitrocellulose layer.

10. A masking film in accordance with claim 1, in which the substantially transparent supporting plastic film is a biaxially oriented polypropylene film and the strippable film is a biaxially oriented polyethyleneterephthalate film.

11. A masking film in accordance with claim 1, in which the substantially transparent supporting plastic film is a biaxially oriented polyethyleneterephthalate film and the strippable film is a biaxially oriented polypropylene film.

12. A masking film in accordance with claim 1, in which both of the substantially transparent supporting plastic film and the strippable film are each a biaxially oriented polyethyleneterephthalate film.

13. A laminate for masking a photo-sensitive material consisting essentially of a substantially transparent supporting plastic film in which at least one surface is roughened or oxidized, and a colored resin layer adhered on said surface through an adhesive undercoating, the color of said resin layer being such as to be opaque to light used to expose said photosensitive material and transparent to other visible light.

14. A laminate in accordance with claim 13, in which the substantially transparent supporting plastic film is a biaxially oriented polypropylene or polyethyleneterephthalate film, the colored resin layer comprises a mixture containing nitrocellulose and at least one colorant, and the adhesive undercoating comprises a mixture containing isophthalic polyester, butyletherified melamine and a small amount of sulfuric acid.

15. A masking film according to claim 7, wherein the thickness of the colored resin layer is about 3 to 10 microns.

* * * * *